United States Patent
Agarwal et al.

(10) Patent No.: US 12,213,078 B2
(45) Date of Patent: Jan. 28, 2025

(54) SECONDARY COMPONENT CARRIER DROP FOR POWER HEADROOM

(71) Applicant: QUALCOMM Incorporated, San Diego, CA (US)

(72) Inventors: Nitin Agarwal, San Diego, CA (US); Girish Khandelwal, San Diego, CA (US); Sitaramanjaneyulu Kanamarlapudi, San Diego, CA (US); Sanghoon Kim, Saratoga, CA (US)

( * ) Notice: Subject to any disclaimer, the term of this patent is extended or adjusted under 35 U.S.C. 154(b) by 168 days.

(21) Appl. No.: 17/444,495

(22) Filed: Aug. 5, 2021

(65) Prior Publication Data

US 2022/0046548 A1 Feb. 10, 2022

Related U.S. Application Data

(60) Provisional application No. 62/706,287, filed on Aug. 7, 2020.

(51) Int. Cl.
*H04W 52/14* (2009.01)
*H04W 52/36* (2009.01)
*H04W 52/56* (2009.01)
*H04W 76/15* (2018.01)

(52) U.S. Cl.
CPC ....... *H04W 52/146* (2013.01); *H04W 52/365* (2013.01); *H04W 52/56* (2013.01); *H04W 76/15* (2018.02)

(58) Field of Classification Search
CPC . H04W 52/146; H04W 76/15; H04W 52/365; H04W 52/56
See application file for complete search history.

(56) References Cited

U.S. PATENT DOCUMENTS

| | | | |
|---|---|---|---|
| 11,265,878 B1* | 3/2022 | Marupaduga | H04L 5/001 |
| 11,646,832 B2* | 5/2023 | Rastegardoost | H04L 5/0055 |
| | | | 370/329 |
| 2010/0272091 A1 | 10/2010 | Fabien et al. | |
| 2013/0114505 A1* | 5/2013 | Haim | H04W 52/367 |
| | | | 370/328 |
| 2015/0341945 A1* | 11/2015 | Panchal | H04L 5/0098 |
| | | | 370/329 |
| 2017/0012758 A1* | 1/2017 | Khay-Ibbat | H04L 5/0057 |
| 2017/0195890 A1* | 7/2017 | Chen | H04W 72/0446 |
| 2018/0049206 A1* | 2/2018 | Yerramalli | H04W 16/14 |
| 2018/0077691 A1* | 3/2018 | Seo | H04W 72/21 |

(Continued)

FOREIGN PATENT DOCUMENTS

| | | | | |
|---|---|---|---|---|
| CN | 104106299 A | * | 10/2014 | H04B 7/024 |
| CN | 111602435 A | * | 8/2020 | H04W 24/08 |

(Continued)

OTHER PUBLICATIONS

International Search Report and Written Opinion—PCT/US2021/071133—ISA/EPO—Nov. 16, 2021.

*Primary Examiner* — Basil Ma

(57) ABSTRACT

Various aspects of the present disclosure generally relate to wireless communication. In some aspects, a user equipment (UE) may transmit communications on a primary component carrier and a secondary component carrier (SCC). The UE may refrain from transmission on the SCC based at least in part on an error rate for transmission on the SCC and an amount of transmission power headroom for the UE. Numerous other aspects are provided.

30 Claims, 9 Drawing Sheets

400 ⟶

(56) References Cited

U.S. PATENT DOCUMENTS

| | | | | |
|---|---|---|---|---|
| 2020/0022165 A1* | 1/2020 | Zhang | ................... | H04L 1/0061 |
| 2020/0314747 A1* | 10/2020 | Zhou | .................... | H04W 72/23 |
| 2020/0329523 A1* | 10/2020 | Yi | ......................... | H04W 72/51 |
| 2020/0358487 A1* | 11/2020 | Yang | .................... | H04L 1/1819 |
| 2020/0389848 A1* | 12/2020 | Ji | ............................ | H04L 1/203 |
| 2023/0069112 A1* | 3/2023 | Hu | ....................... | H04W 72/23 |

FOREIGN PATENT DOCUMENTS

| | | | | |
|---|---|---|---|---|
| WO | WO-2020026305 A1 * | 2/2020 | ........... | H04L 1/0003 |
| WO | WO-2020092524 A1 | 5/2020 | | |

\* cited by examiner

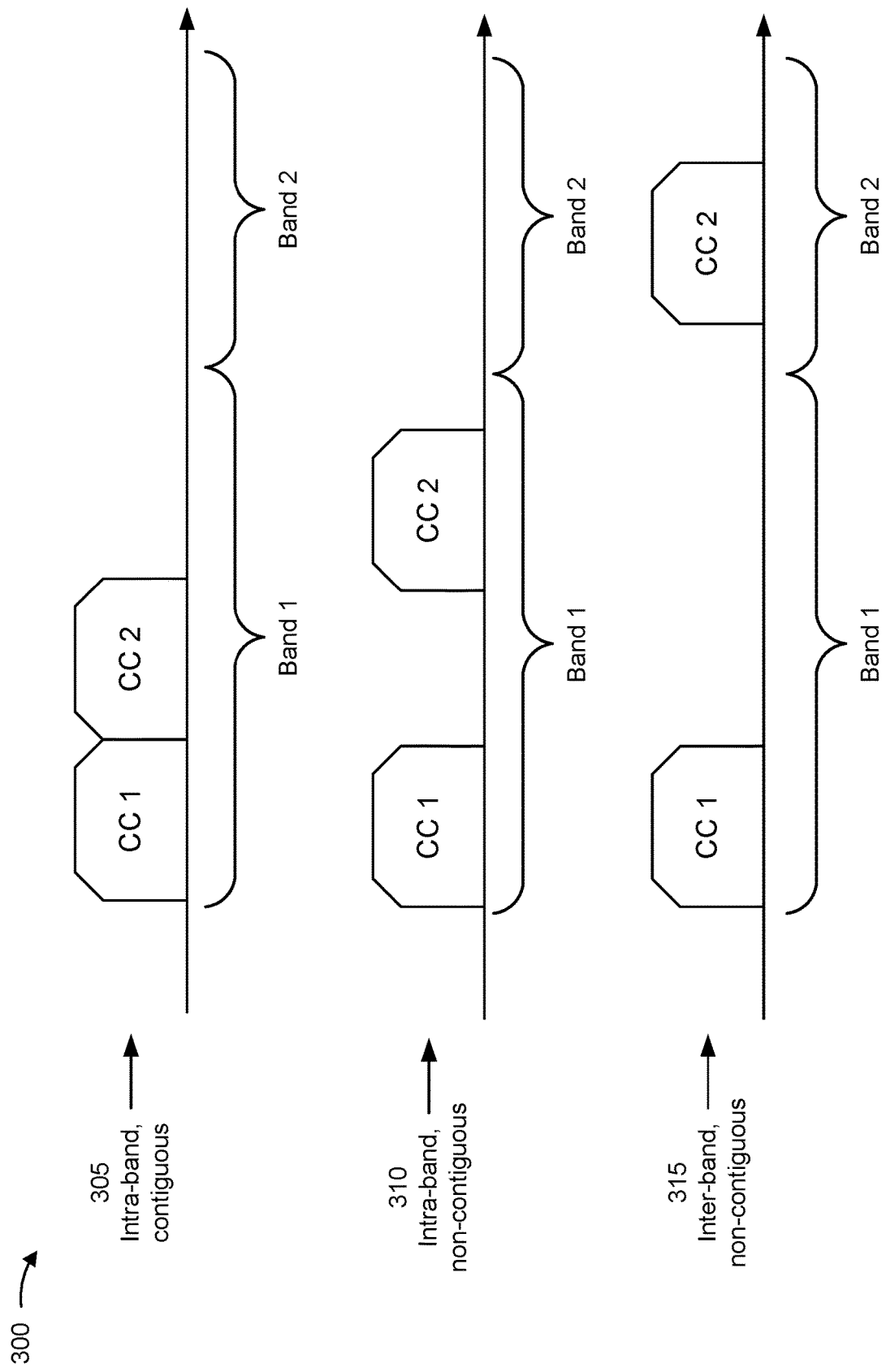

SECONDARY COMPONENT CARRIER DROP FOR POWER HEADROOM

CROSS-REFERENCE TO RELATED APPLICATION

This Patent Application claims priority to U.S. Provisional Patent Application No. 62/706,287, filed on Aug. 7, 2020, entitled "SECONDARY COMPONENT CARRIER DROP FOR POWER HEADROOM," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dropping a secondary component carrier for power headroom.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes transmitting communications on a primary component carrier (PCC) and a secondary component carrier (SCC), and refraining from transmission on the SCC based at least in part on an error rate for transmission on the SCC and an amount of transmission power headroom for the UE.

In some aspects, a method of wireless communication performed by a base station includes scheduling uplink communications for a UE on a PCC and an SCC, and adjusting scheduling of uplink communications for the UE on the SCC based at least in part on an error rate for transmission on the SCC and an amount of transmission power headroom for the UE.

In some aspects, a UE for wireless communication includes a memory and one or more processors coupled to the memory, the one or more processors configured to transmit communications on a PCC and an SCC, and refrain from transmission on the SCC based at least in part on an error rate for transmission on the SCC and an amount of transmission power headroom for the UE.

In some aspects, a base station for wireless communication includes a memory and one or more processors coupled to the memory, the one or more processors configured to schedule uplink communications for a UE on a PCC and an SCC, and adjust scheduling of uplink communications for the UE on the SCC based at least in part on an error rate for transmission on the SCC and an amount of transmission power headroom for the UE.

In some aspects, a non-transitory computer-readable medium storing a set of instructions for wireless communication includes one or more instructions that, when executed by one or more processors of a UE, cause the UE to transmit communications on a PCC and an SCC, and refrain from transmission on the SCC based at least in part on an error rate for transmission on the SCC and an amount of transmission power headroom for the UE.

In some aspects, a non-transitory computer-readable medium storing a set of instructions for wireless communication includes one or more instructions that, when executed by one or more processors of a base station, cause the base station to schedule uplink communications for a UE on a PCC and an SCC, and adjust scheduling of uplink communications for the UE on the SCC based at least in part on an error rate for transmission on the SCC and an amount of transmission power headroom for the UE.

In some aspects, an apparatus for wireless communication includes means for transmitting communications on a PCC and an SCC, and means for refraining from transmission on the SCC based at least in part on an error rate for transmission on the SCC and an amount of transmission power headroom for the apparatus.

In some aspects, an apparatus for wireless communication includes means for scheduling uplink communications for a UE on a PCC and an SCC, and means for adjusting scheduling of uplink communications for the UE on the SCC based at least in part on an error rate for transmission on the SCC and an amount of transmission power headroom for the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antennas, radio frequency (RF)-chains, power amplifiers, modulators, buffers, processor(s), interleavers, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating examples of carrier aggregation, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
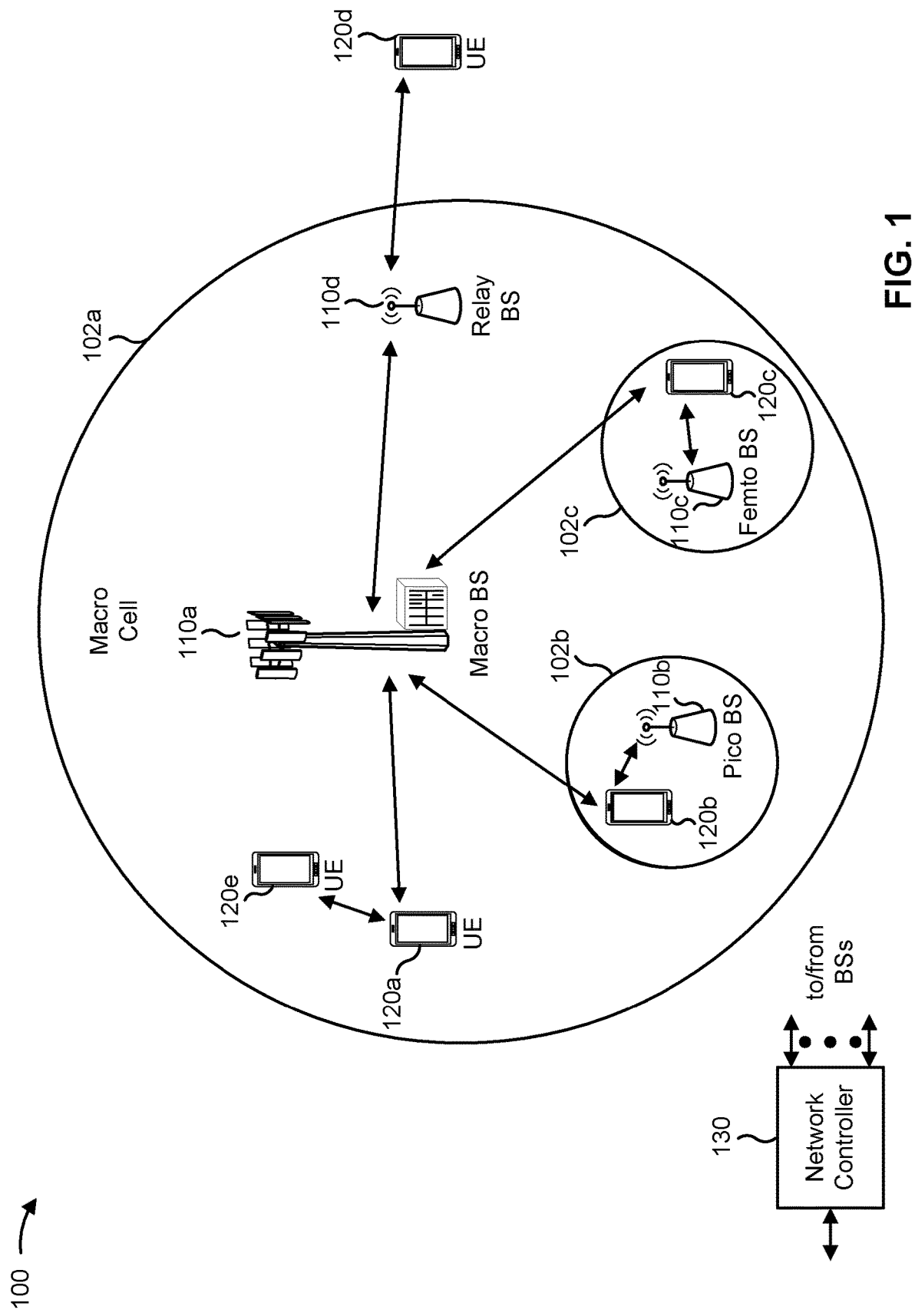
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" (mmWave) band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
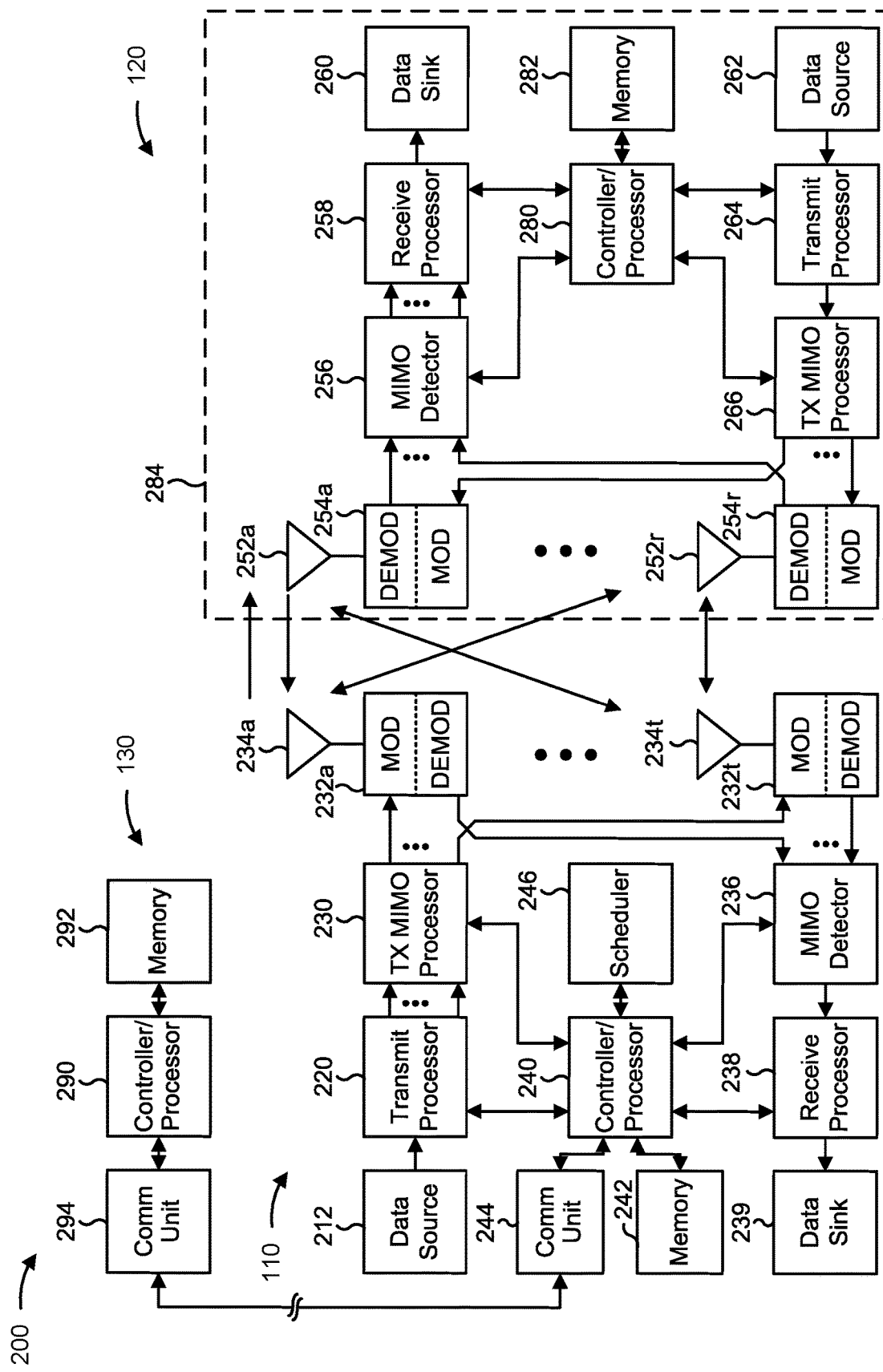
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with dropping a secondary component carrier (SCC) for power headroom, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for transmitting communications on a primary component carrier (PCC) and an SCC, and/or means for refraining from transmission on the SCC based at least in part on an error rate for transmission on the SCC and an amount of transmission power headroom for the UE. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for scheduling uplink communications for a UE on a PCC and an SCC, and/or means for adjusting scheduling of uplink communications for the UE on the SCC based at least in part on an error rate for transmission on the SCC and an amount of transmission power headroom for the UE. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating examples 300 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message and/or downlink control information (DCI).

As shown by reference number 305, in some aspects, carrier aggregation may be configured in an intra-band contiguous mode where the aggregated carriers are contiguous to one another and are in the same band. As shown by reference number 310, in some aspects, carrier aggregation may be configured in an intra-band non-contiguous mode where the aggregated carriers are non-contiguous to one another and are in the same band. As shown by reference number 315, in some aspects, carrier aggregation may be configured in an inter-band non-contiguous mode where the aggregated carriers are non-contiguous to one another and are in different bands.

In carrier aggregation, a UE 120 may be configured with a PCC and one or more SCCs. In some aspects, the PCC may carry control information (e.g., DCI, scheduling information, and/or the like) for scheduling data communications on one or more SCCs, which may be referred to as cross-carrier scheduling. In some aspects, a carrier (e.g., a PCC or an SCC) may carry control information for scheduling data communications on the carrier, which may be referred to as self-carrier scheduling or carrier self-scheduling.

As indicated above, FIG. 3 is provided as an example. Other examples may differ from what is described with regard to FIG. 3.

A network may schedule grants for a UE for uplink carrier aggregation (or dual connectivity). However, network parameters may not be optimized for the grants. As a result, communications may degrade and the UE may waste power. For example, the network may consider uplink metrics for decoding a physical uplink shared channel (PUSCH) on multiple carriers, but not consider how much power is available to the UE (power headroom) for transmitting on an SCC. For example, a power headroom index of a UE may be 33, indicating there is no power available for the UE to transmit on the SCC, but the network may continue allocating grants on the SCC. Consequently, the grants for the SCC lead to a high block error rate (BLER). If the BLER is high on an SCC and hybrid automatic repeat request (HARD) does not resolve the BLER, retransmissions will be necessary. These retransmissions may increase latency at higher layers and cause throughput degradation. This results in the UE and the network wasting power, processing resources, and signaling resources.

According to various aspects described herein, the UE may drop the SCC when the UE determines that the SCC is failing (e.g., high BLER) and that there is not enough power headroom for the SCC (e.g., PCC is taking too much power). For example, the UE may refrain from transmitting on the SCC (e.g., ignore uplink grants for the SCC) and/or apply discontinuous transmission on the PUSCH until the power headroom improves. In some aspects, the UE may wait for certain transmission time intervals, store data for calculating the BLER, and/or establish a pattern with power headroom reports. If the BLER is higher than a certain percentage (e.g., BLER threshold) during a certain period of time, power headroom is below a certain level, and/or a pathloss is above a certain level (which may be reflected in an error rate), the UE may drop the SCC. In some aspects, the UE may wait to exhaust a HARQ procedure before dropping the SCC, which may include muting or refraining from transmitting on the PUSCH using the SCC. As a result, the UE and network will save power, improve latency, and conserve time, power, processing resources, and signaling resources that would otherwise be consumed by retransmissions. The UE also reduces unnecessary radio energy emissions, which are regulated, and the network may improve bandwidth efficiency. In addition, the UE will have more power for PCC on average and improve overall throughput.

Figure 4A:
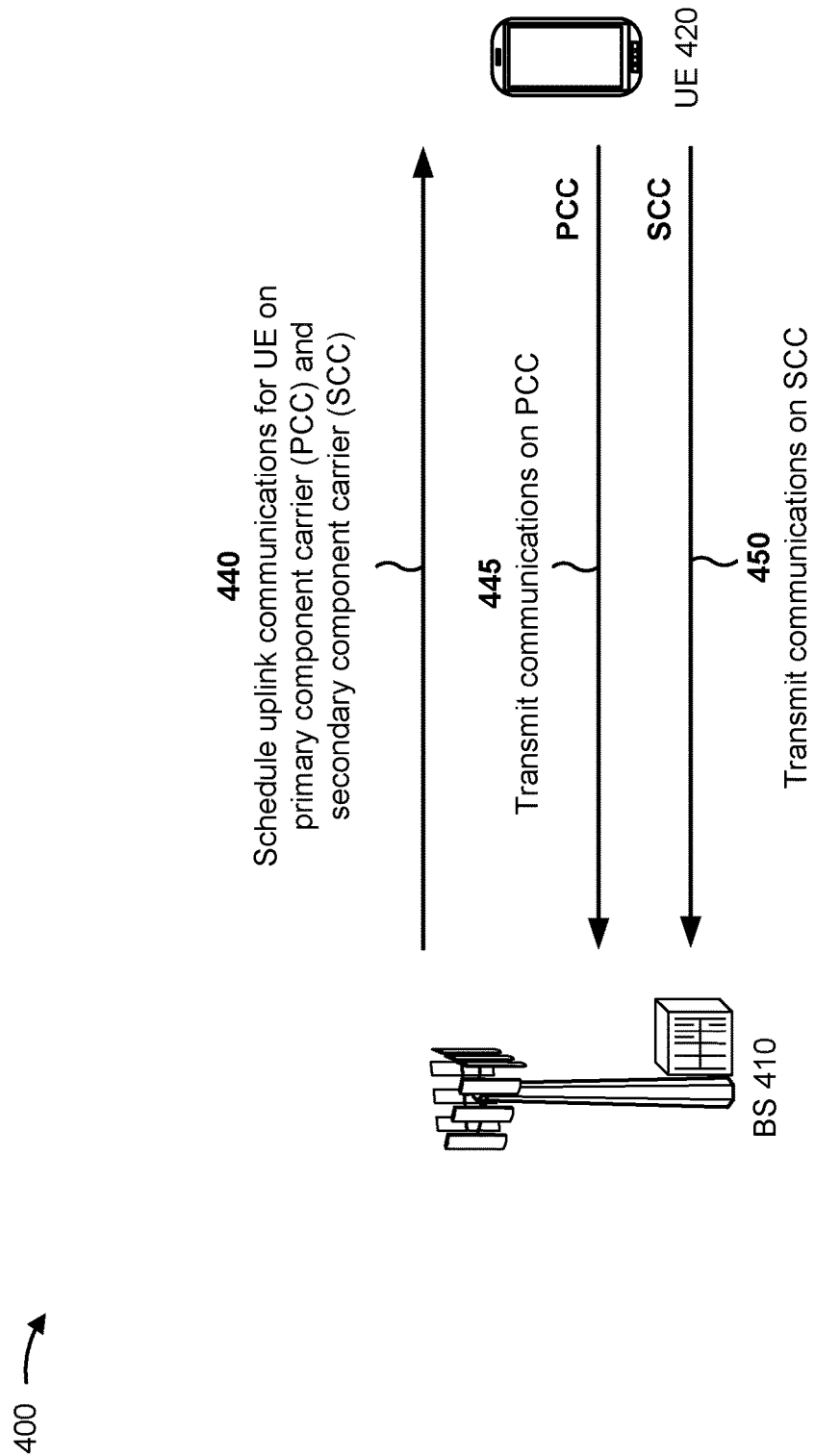
FIGS. 4A-4B are diagrams illustrating an example of dropping a secondary component carrier for power headroom, in accordance with the present disclosure.
Figure 4B:
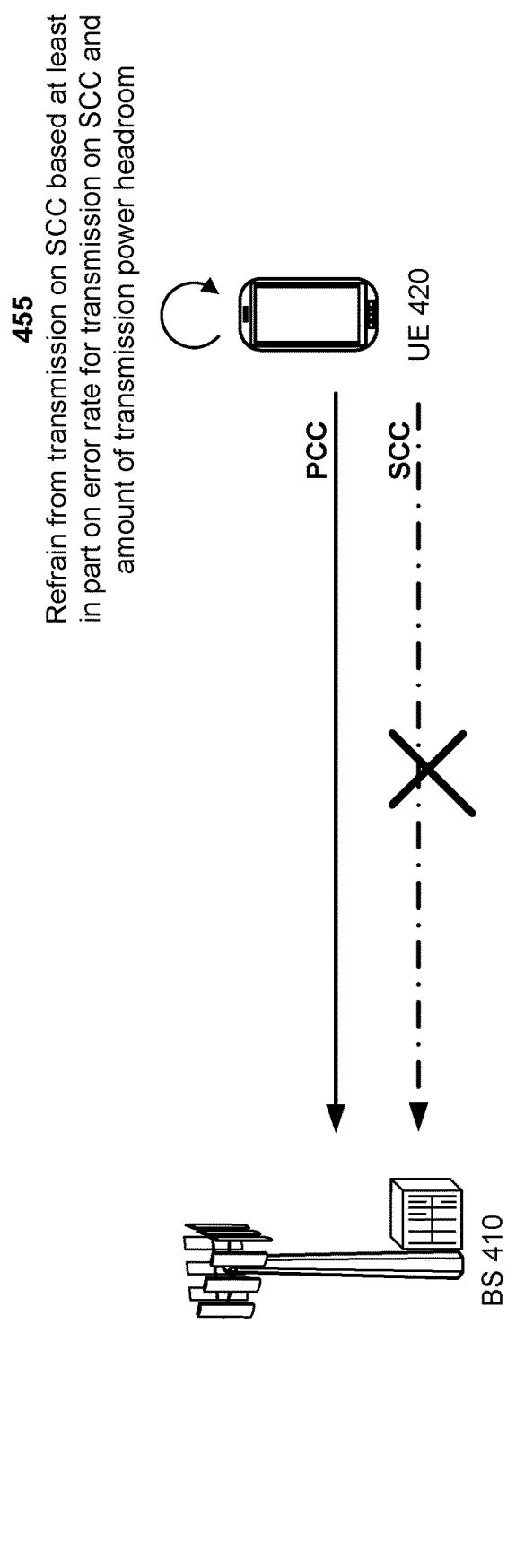

FIGS. 4A-4B are diagrams illustrating an example 400 of dropping an SCC for power headroom, in accordance with the present disclosure. As shown in FIGS. 4A-4B, example 400 includes communication between a base station (BS) 410 (e.g., a BS 110 depicted in FIGS. 1 and 2) and a UE 420 (e.g., a UE 120 depicted in FIGS. 1 and 2). In some aspects, BS 410 and UE 420 may be included in a wireless network, such as wireless network 100. BS 410 and UE 420 may communicate using carrier aggregation, where BS 410 and UE 420 communicate on a PCC, which may include an uplink and a downlink, and an SCC, which may include an uplink and a downlink. While FIGS. 4A-4B illustrate carrier aggregation (e.g., NR PCC/SCC), in some aspects, UE 420 may communicate with another BS using dual connectivity. The carrier aggregation may be for transmissions in mmWave (FR2) and/or FR1.

BS 410 may schedule uplink communications for UE 420 on the PCC and the SCC, as shown by reference number 440. Consequently, UE 420 may transmit communications on the PCC and the SCC, as shown by respective reference numbers 445 and 450. UE 420 may also receive communications on the PCC and the SCC, but power requirements are higher for transmission and thus, for purposes of explanation, example 400 shows transmission by UE 420.

UE 420 may experience a certain error rate on the SCC, a certain amount of pathloss, and/or a drop in power headroom by a certain amount. The power headroom may be too low (e.g., drops by a threshold amount or reaches a threshold amount), and thus UE 420 may determine to drop the SCC. The SCC may also have an error rate that is too high (e.g., increases by a threshold amount or reaches a threshold amount). Note that an amount of increase or decrease may be calculated with respect to an absolute threshold amount.

As shown by FIG. 4B and by reference number 455, UE 420 may refrain from transmission on the SCC based at least in part on an error rate and an amount of power headroom. UE 420 may not necessarily shut down the signaling hardware. Instead, UE 420 may ignore uplink grants from BS 410 (not transmit according to the grants). Resources may be transferred to another link, which may be the PCC or another SCC that requires less power. The medium access control (MAC) layer may not build a transport block on the SCC and resources may be scheduled on the PCC automatically. In some aspects, UE 420 may transmit acknowledgments for a higher layer SCC payload as part of a PCC payload. Alternatively, in some aspects, UE 420 may apply a discontinuous transmission mode on the PUSCH, such that uplink data is transferred on the SCC at certain periods of time.

While example 400 describes a scenario with carrier aggregation, the operations described in connection with FIGS. 4A-4B may be extended to other dual carrier scenarios, including dual connectivity (e.g., NR dual connectivity). The operations for dual connectivity may be based at least in part on radio conditions and/or power requirements of radio access technologies that are involved.

Conditions may change for the PCC or the SCC, and/or UE 420 may determine that more power headroom is available for one or more reasons. In some aspects, UE 420 may restart uplink transmission on the SCC based at least in part on one or more factors. For example, UE 420 may restart uplink transmission on the SCC (or another SCC) after a certain amount of time. UE 420 may restart transmission on the SCC after the power headroom has increased by a certain amount, after a pathloss condition has passed, after an MCS has decreased by a certain amount (or to a particular level), after a resource block (RB) allocation has decreased by a certain amount, or a combination thereof.

Alternatively, or additionally, BS 410 may address SCC failures due to power headroom issues at UE 420. In some aspects, BS 410 may adjust scheduling grants for uplink communications for UE 420 based at least in part on a determination that UE 420 had dropped the SCC by ignoring uplink grants or by applying discontinuous transmission on a PUSCH. BS 410 may also receive other indications or signaling from UE 420 indicating that UE 420 has dropped transmission on the SCC. BS 410 may adjust scheduling grants by reducing or eliminating the uplink grants to UE 420 for a time.

In some aspects, BS 410 may adjust scheduling grants based at least in part on an error rate (e.g., BLER) of the SCC and a power headroom report from UE 420. For example, BS 410 may adjust scheduling grants based at least in part on a power headroom of UE 420 dropping by a certain amount to a power headroom threshold or becoming negative, pathloss reaching a certain amount, HARQ being exhausted without resolution of an issue, and/or BLER reaching a certain level. UE 420 may both provide and receive power headroom reports.

In some aspects, BS 410 may restart scheduling grants for uplink transmission on the SCC based at least in part on one or more factors described above for UE 420 restarting uplink transmission on the SCC. BS 410 may receive an indication that UE 420 has restarted transmission on the SCC by receiving uplink communications according to scheduled grants that were previously ignored. BS 410 may also determine that discontinuous transmission has stopped, or receive some other indication or signaling from UE 420 that transmission on the SCC has restarted. As a result of dropping and restarting uplink transmission on the SCC, BS 410 and/or UE 420 may operate to dynamically manage uplink transmissions with respect to a power headroom of UE 420, which saves time, power, processing resources, and signaling resources. Communications are also improved.

As indicated above, FIGS. 4A-4B are provided as an example. Other examples may differ from what is described with regard to FIGS. 4A-4B.

Figure 5:
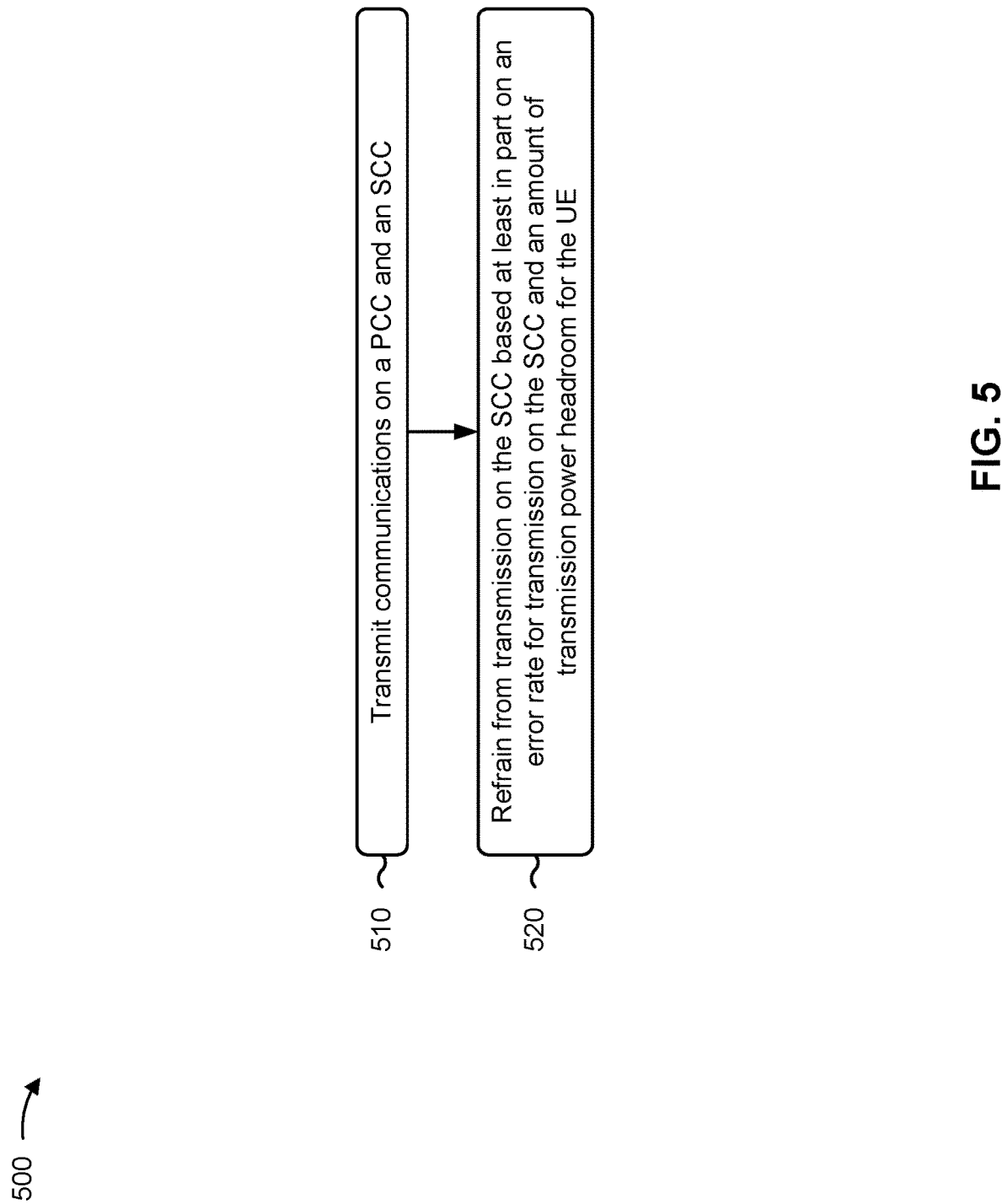
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., a UE 120 depicted in FIGS. 1 and 2, UE 420 depicted in FIGS. 4A-4B) performs operations associated with dropping an SCC for power headroom.

As shown in FIG. 5, in some aspects, process 500 may include transmitting communications on a PCC and an SCC (block 510). For example, the UE (e.g., using antenna 252, transmit processor 264, TX MIMO processor 266, modulator 254, controller/processor 280, and/or memory 282) may transmit communications on a PCC and an SCC, as described above.

As further shown in FIG. 5, in some aspects, process 500 may include refraining from transmission on the SCC based at least in part on an error rate for transmission on the SCC and an amount of transmission power headroom for the UE (block 520). For example, the UE (e.g., using antenna 252, demodulator 254, MIMO detector 256, receive processor 258, transmit processor 264, TX MIMO processor 266, modulator 254, controller/processor 280, and/or memory 282) may refrain from transmission on the SCC based at least in part on an error rate for transmission on the SCC and an amount of transmission power headroom for the UE, as described above.

Process 500 may include additional aspects, such as any single aspect or any combination of aspects described below and/or in connection with one or more other processes described elsewhere herein.

In a first aspect, the error rate is a BLER, and refraining from transmission on the SCC includes refraining from transmission on the SCC based at least in part on a determination that the BLER satisfies a BLER threshold.

In a second aspect, alone or in combination with the first aspect, refraining from transmission on the SCC includes refraining from transmission on the SCC based at least in part on a determination that the error rate has not improved after transmitting HARQ feedback.

In a third aspect, alone or in combination with one or more of the first and second aspects, refraining from transmission on the SCC includes refraining from transmission on the SCC based at least in part on a determination that the amount of transmission power headroom for the UE does not satisfy a power headroom threshold.

In a fourth aspect, alone or in combination with one or more of the first through third aspects, refraining from transmission on the SCC includes refraining from transmission on the SCC based at least in part on a determination that an amount of pathloss satisfies a pathloss threshold.

In a fifth aspect, alone or in combination with one or more of the first through fourth aspects, refraining from transmission on the SCC includes ignoring one or more grants for transmission on the SCC.

In a sixth aspect, alone or in combination with one or more of the first through fifth aspects, process 500 includes applying discontinuous transmission on a PUSCH.

In a seventh aspect, alone or in combination with one or more of the first through sixth aspects, process 500 includes transmitting an acknowledgement (ACK) on the PCC for data received on the SCC.

In an eighth aspect, alone or in combination with one or more of the first through seventh aspects, process 500 includes restarting transmission on the SCC after a configured time duration.

In a ninth aspect, alone or in combination with one or more of the first through eighth aspects, process 500 includes restarting transmission on the SCC based at least in part on a determination that the amount of transmission power headroom for the UE has increased by a threshold amount.

In a tenth aspect, alone or in combination with one or more of the first through ninth aspects, process 500 includes restarting transmission on the SCC based at least in part on a determination that an MCS decreased by a threshold amount.

In an eleventh aspect, alone or in combination with one or more of the first through tenth aspects, process 500 includes restarting transmission on the SCC based at least in part on a determination that a resource block allocation decreased by a threshold amount.

In a twelfth aspect, alone or in combination with one or more of the first through eleventh aspects, the PCC and the SCC are associated with carrier aggregation.

In a thirteenth aspect, alone or in combination with one or more of the first through twelfth aspects, the PCC and the SCC are associated with dual connectivity.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
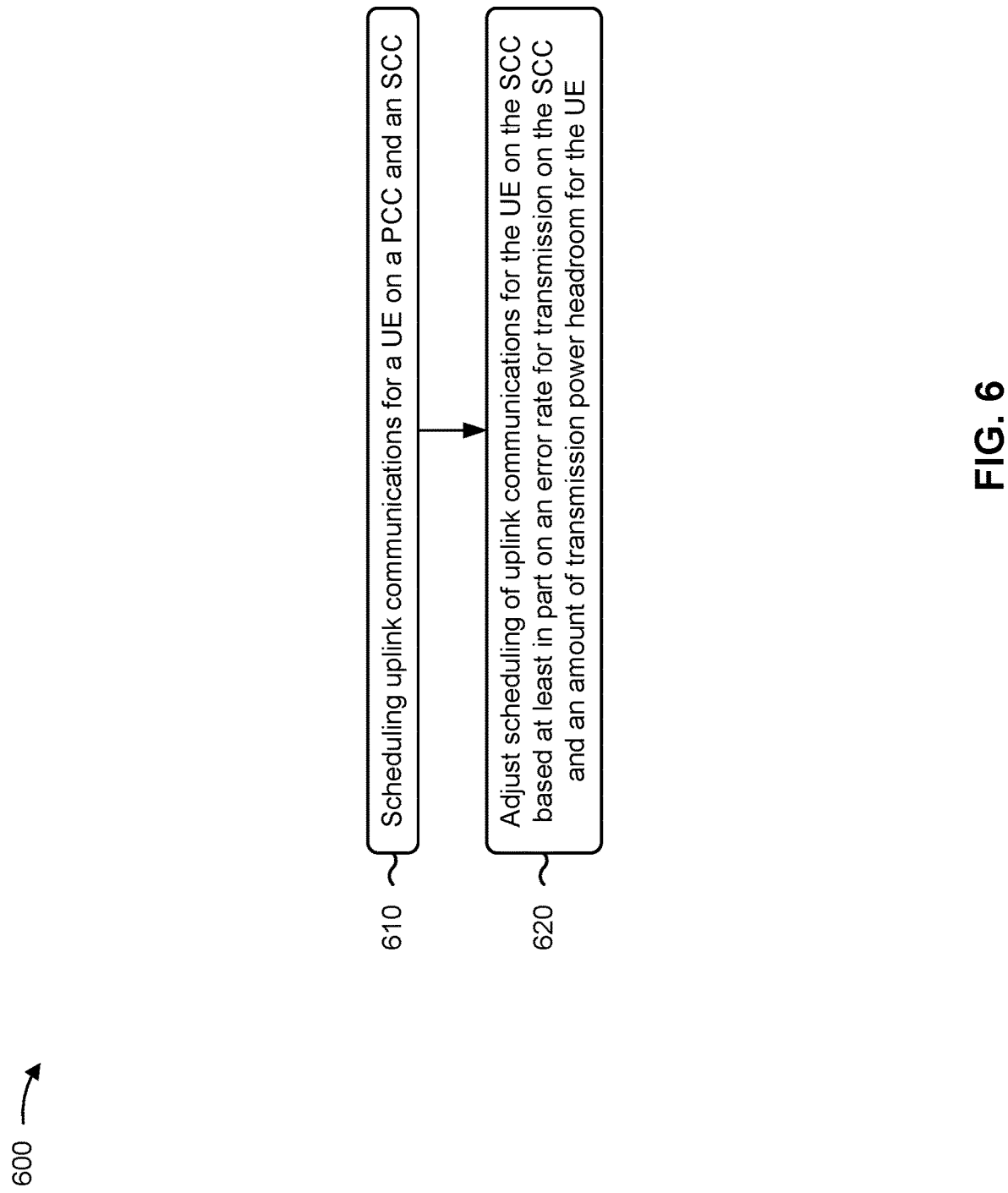
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110 depicted in FIGS. 1 and 2, BS 410 depicted in FIGS. 4A-4B) performs operations associated with dropping an SCC for power headroom.

As shown in FIG. 6, in some aspects, process 600 may include scheduling uplink communications for a UE on a PCC and an SCC (block 610). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may schedule uplink communications for a UE on a PCC and an SCC, as described above.

As further shown in FIG. 6, in some aspects, process 600 may include adjusting scheduling of uplink communications for the UE on the SCC based at least in part on an error rate for transmission on the SCC and an amount of transmission power headroom for the UE (block 620). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may adjust scheduling of uplink communications for the UE on the SCC based at least in part on an error rate for transmission on the SCC and an amount of transmission power headroom for the UE, as described above.

Process 600 may include additional aspects, such as any single aspect or any combination of aspects described below and/or in connection with one or more other processes described elsewhere herein.

In a first aspect, the error rate is a BLER, and adjusting scheduling of uplink communications on the SCC includes adjusting scheduling of uplink communications on the SCC based at least in part on a determination that the BLER satisfies a BLER threshold.

In a second aspect, alone or in combination with the first aspect, adjusting scheduling of uplink communications on the SCC includes adjusting scheduling of uplink communications on the SCC based at least in part on a determination that the error rate has not improved after receiving HARQ feedback.

In a third aspect, alone or in combination with one or more of the first and second aspects, adjusting scheduling of uplink communications on the SCC includes adjusting scheduling of uplink communications on the SCC based at least in part on a determination that the amount of transmission power headroom for the UE does not satisfy a power headroom threshold.

In a fourth aspect, alone or in combination with one or more of the first through third aspects, adjusting scheduling of uplink communications on the SCC includes adjusting scheduling of uplink communications on the SCC based at least in part on a determination that an amount of pathloss satisfies a pathloss threshold.

In a fifth aspect, alone or in combination with one or more of the first through fourth aspects, adjusting scheduling of uplink communications on the SCC includes reducing the scheduling of uplink communications on the SCC.

In a sixth aspect, alone or in combination with one or more of the first through fifth aspects, adjusting scheduling of uplink communications on the SCC includes refraining from scheduling uplink communications on the SCC.

In a seventh aspect, alone or in combination with one or more of the first through sixth aspects, process 600 includes scheduling the UE to apply discontinuous transmission on a PUSCH.

In an eighth aspect, alone or in combination with one or more of the first through seventh aspects, process 600 includes receiving an ACK on the PCC for data transmitted on the SCC.

In a ninth aspect, alone or in combination with one or more of the first through eighth aspects, process 600 includes restarting or increasing scheduling of uplink communications for the UE on the SCC after a configured time duration.

In a tenth aspect, alone or in combination with one or more of the first through ninth aspects, process 600 includes restarting or increasing scheduling of uplink communications for the UE on the SCC based at least in part on a determination that the amount of transmission power headroom for the UE has increased by a threshold amount.

In an eleventh aspect, alone or in combination with one or more of the first through tenth aspects, process 600 includes restarting or increasing scheduling of uplink communications for the UE on the SCC based at least in part on a determination that an MCS decreased by a threshold amount.

In a twelfth aspect, alone or in combination with one or more of the first through eleventh aspects, process 600 includes restarting or increasing scheduling of uplink communications for the UE on the SCC based at least in part on a determination that a resource block allocation decreased by a threshold amount.

In a thirteenth aspect, alone or in combination with one or more of the first through twelfth aspects, the PCC and the SCC are associated with carrier aggregation.

In a fourteenth aspect, alone or in combination with one or more of the first through thirteenth aspects, the PCC and the SCC are associated with dual connectivity.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
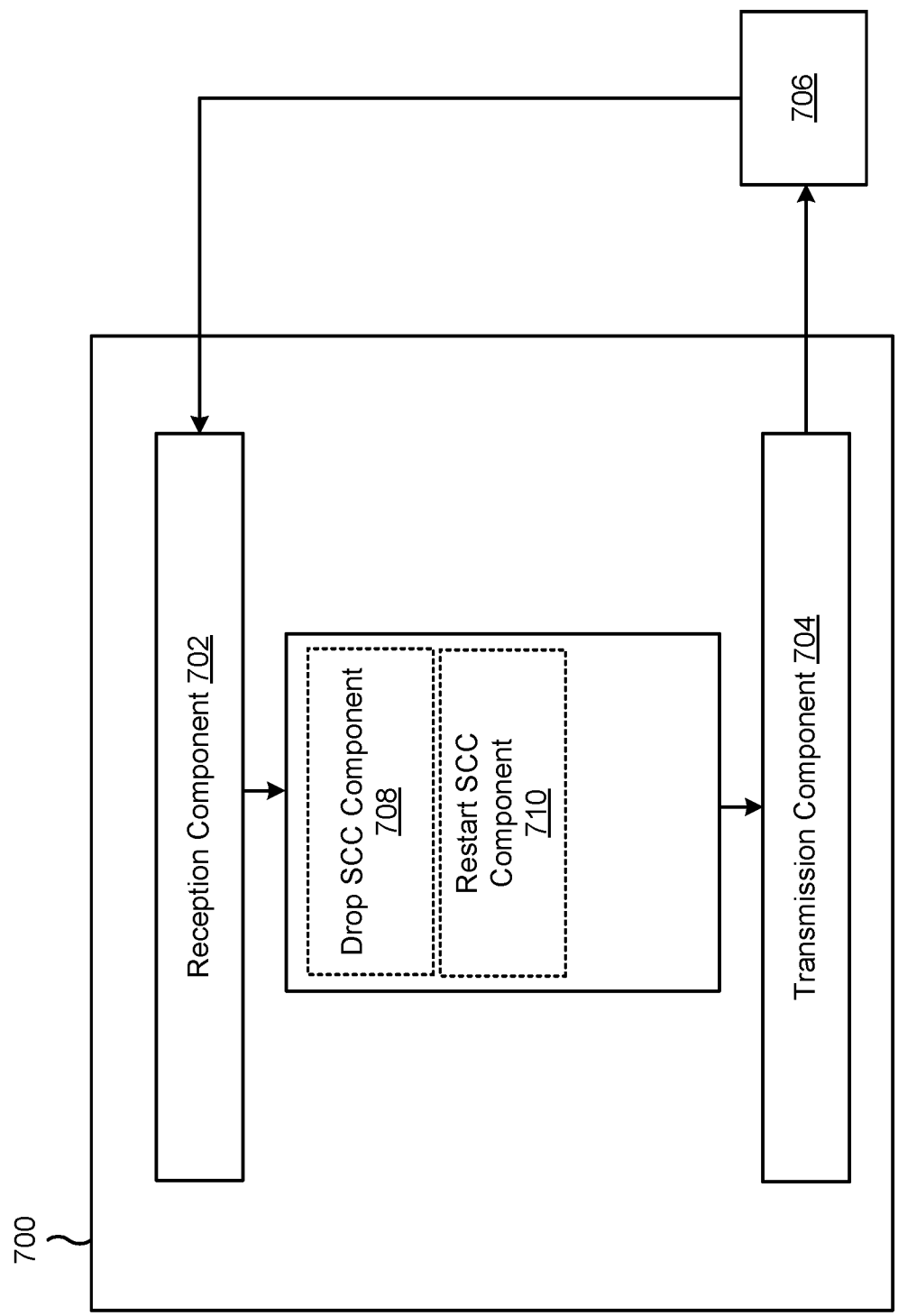
FIG. 7 is a block diagram of an example apparatus for wireless communication, in accordance with the present disclosure.

FIG. 7 is a block diagram of an example apparatus 700 for wireless communication. The apparatus 700 may be a UE (e.g., UE 120, UE 420), or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a drop SCC component 708 or a restart SCC component 710, among other examples.

In some aspects, the apparatus 700 may be configured to perform one or more operations described herein in connection with FIGS. 4-6. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver. The transmission component 704 may transmit communications on a PCC and an SCC.

The drop SCC component 708 may refrain from transmission on the SCC based at least in part on an error rate for transmission on the SCC and an amount of transmission power headroom for the UE. In some aspects, the drop SCC component 708 may include a demodulator, a MIMO detector, a receive processor, a modulator, a transmit MIMO processor, a transmit processor, a controller/processor, a memory, or a combination thereof, of the UE described above in connection with FIG. 2.

The drop SCC component 708 may include a memory. The drop SCC component 708 may include one or more processors operatively coupled to the memory, the memory and the one or more processors configured to refrain from transmission on the SCC based at least in part on an error rate for transmission on the SCC and an amount of transmission power headroom for the UE.

The drop SCC component 708 may include one or more instructions that, when executed by one or more processors of a UE, cause the UE to refrain from transmission on the SCC based at least in part on an error rate for transmission on the SCC and an amount of transmission power headroom for the UE.

The restart SCC component 710 may restart transmission on the SCC. In some aspects, the restart SCC component 710 may include a demodulator, a MIMO detector, a receive processor, a modulator, a transmit MIMO processor, a transmit processor, a controller/processor, a memory, or a combination thereof, of the UE described above in connection with FIG. 2.

The restart SCC component 710 may include a memory. The restart SCC component 710 may include one or more processors operatively coupled to the memory, the memory and the one or more processors configured to restart transmission on the SCC.

The restart SCC component 710 may include one or more instructions that, when executed by one or more processors of a UE, cause the UE to restart transmission on the SCC.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
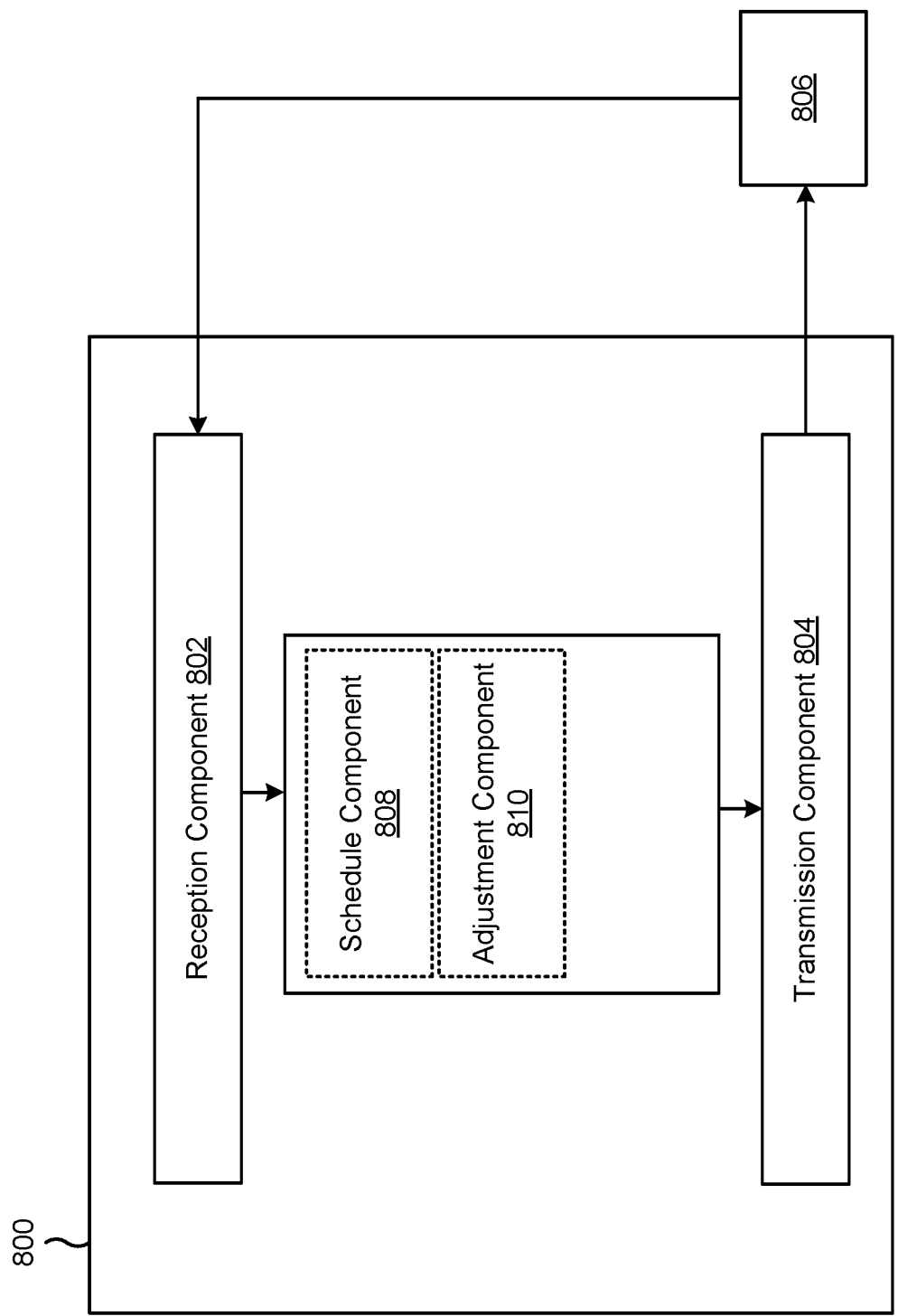
FIG. 8 is a block diagram of an example apparatus for wireless communication, in accordance with the present disclosure.

FIG. 8 is a block diagram of an example apparatus 800 for wireless communication. The apparatus 800 may be a base station (e.g., BS 110, BS 410), or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a schedule component 808 or an adjustment component 810, among other examples.

In some aspects, the apparatus 800 may be configured to perform one or more operations described herein in connection with FIGS. 4-6. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be collocated with the reception component 802 in a transceiver.

The schedule component 808 may schedule uplink communications for a UE on a PCC and an SCC. In some aspects, the schedule component 808 may include a receive processor, a transmit processor, a controller/processor, a memory, or a combination thereof, of the base station described above in connection with FIG. 2.

The schedule component 808 may include a memory. The schedule component 808 may include one or more processors operatively coupled to the memory, the memory and the one or more processors configured to schedule uplink communications for a UE on a PCC and an SCC.

The schedule component 808 may include one or more instructions that, when executed by one or more processors of a base station, cause the base station to schedule uplink communications for a UE on a PCC and an SCC.

The adjustment component 810 may adjust scheduling of uplink communications for the UE on the SCC based at least in part on an error rate for transmission on the SCC and an amount of transmission power headroom for the UE. In some aspects, the adjustment component 810 may include a receive processor, a transmit processor, a controller/processor, a memory, or a combination thereof, of the base station described above in connection with FIG. 2.

The adjustment component 810 may include a memory. The adjustment component 810 may include one or more processors operatively coupled to the memory, the memory and the one or more processors configured to adjust scheduling of uplink communications for the UE on the SCC based at least in part on an error rate for transmission on the SCC and an amount of transmission power headroom for the UE.

The adjustment component 810 may include one or more instructions that, when executed by one or more processors of a base station, cause the base station to adjust scheduling of uplink communications for the UE on the SCC based at least in part on an error rate for transmission on the SCC and an amount of transmission power headroom for the UE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: transmitting communications on a primary component carrier (PCC) and a secondary component carrier (SCC); and refraining from transmission on the SCC based at least in part on an error rate for transmission on the SCC and an amount of transmission power headroom for the UE.

Aspect 2: The method of Aspect 1, wherein the error rate is a block error rate (BLER), and wherein refraining from transmission on the SCC includes refraining from transmission on the SCC based at least in part on a determination that the BLER satisfies a BLER threshold.

Aspect 3: The method of Aspect 1 or 2, wherein refraining from transmission on the SCC includes refraining from transmission on the SCC based at least in part on a determination that the error rate has not improved after transmitting hybrid automatic repeat request feedback.

Aspect 4: The method of any of Aspects 1-3, wherein refraining from transmission on the SCC includes refraining from transmission on the SCC based at least in part on a determination that the amount of transmission power headroom for the UE does not satisfy a power headroom threshold.

Aspect 5: The method of any of Aspects 1-4, wherein refraining from transmission on the SCC includes refraining from transmission on the SCC based at least in part on a determination that an amount of pathloss satisfies a pathloss threshold.

Aspect 6: The method of any of Aspects 1-5, wherein refraining from transmission on the SCC includes ignoring one or more grants for transmission on the SCC.

Aspect 7: The method of any of Aspects 1-6, further comprising applying discontinuous transmission on a physical uplink shared channel.

Aspect 8: The method of any of Aspects 1-7, further comprising transmitting an acknowledgement on the PCC for data received on the SCC.

Aspect 9: The method of any of Aspects 1-8, further comprising restarting transmission on the SCC after a configured time duration.

Aspect 10: The method of any of Aspects 1-9, further comprising restarting transmission on the SCC based at least in part on a determination that the amount of transmission power headroom for the UE has increased by a threshold amount.

Aspect 11: The method of any of Aspects 1-10, further comprising restarting transmission on the SCC based at least in part on a determination that a modulation and coding scheme decreased by a threshold amount.

Aspect 12: The method of any of Aspects 1-11, further comprising restarting transmission on the SCC based at least in part on a determination that a resource block allocation decreased by a threshold amount.

Aspect 13: The method of any of Aspects 1-12, wherein the PCC and the SCC are associated with carrier aggregation.

Aspect 14: The method of any of Aspects 1-13, wherein the PCC and the SCC are associated with dual connectivity.

Aspect 15: A method of wireless communication performed by a base station, comprising: scheduling uplink communications for a user equipment (UE) on a primary component carrier (PCC) and a secondary component carrier (SCC); and adjusting scheduling of uplink communications for the UE on the SCC based at least in part on an error rate for transmission on the SCC and an amount of transmission power headroom for the UE.

Aspect 16: The method of Aspect 15, wherein the error rate is a block error rate (BLER), and wherein adjusting scheduling of uplink communications on the SCC includes adjusting scheduling of uplink communications on the SCC based at least in part on a determination that the BLER satisfies a BLER threshold.

Aspect 17: The method of Aspect 15 or 16, wherein adjusting scheduling of uplink communications on the SCC includes adjusting scheduling of uplink communications on the SCC based at least in part on a determination that the error rate has not improved after receiving hybrid automatic repeat request feedback.

Aspect 18: The method of any of Aspects 15-17, wherein adjusting scheduling of uplink communications on the SCC includes adjusting scheduling of uplink communications on the SCC based at least in part on a determination that the amount of transmission power headroom for the UE does not satisfy a power headroom threshold.

Aspect 19: The method of any of Aspects 15-18, wherein adjusting scheduling of uplink communications on the SCC includes adjusting scheduling of uplink communications on the SCC based at least in part on a determination that an amount of pathloss satisfies a pathloss threshold.

Aspect 20: The method of any of Aspects 15-19, wherein adjusting scheduling of uplink communications on the SCC includes reducing the scheduling of uplink communications on the SCC.

Aspect 21: The method of any of Aspects 15-20, wherein adjusting scheduling of uplink communications on the SCC includes refraining from scheduling uplink communications on the SCC.

Aspect 22: The method of any of Aspects 15-21, further comprising scheduling the UE to apply discontinuous transmission on a physical uplink shared channel.

Aspect 23: The method of any of Aspects 15-22, further comprising receiving an acknowledgement on the PCC for data transmitted on the SCC.

Aspect 24: The method of any of Aspects 15-23, further comprising restarting or increasing scheduling of uplink communications for the UE on the SCC after a configured time duration.

Aspect 25: The method of any of Aspects 15-24, further comprising restarting or increasing scheduling of uplink communications for the UE on the SCC based at least in part on a determination that the amount of transmission power headroom for the UE has increased by a threshold amount.

Aspect 26: The method of any of Aspects 15-25, further comprising restarting or increasing scheduling of uplink communications for the UE on the SCC based at least in part on a determination that a modulation and coding scheme decreased by a threshold amount.

Aspect 27: The method of any of Aspects 15-26, further comprising restarting or increasing scheduling of uplink communications for the UE on the SCC based at least in part on a determination that a resource block allocation decreased by a threshold amount.

Aspect 28: The method of any of Aspects 15-27, wherein the PCC and the SCC are associated with carrier aggregation.

Aspect 29: The method of any of Aspects 15-28, wherein the PCC and the SCC are associated with dual connectivity.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising a memory and one or more processors coupled to the memory, the one or more processors configured to perform the method of one or more of Aspects 1-29.

Aspect 32: An apparatus for wireless communication, comprising at least one means for performing the method of one or more of Aspects 1-29.

Aspect 33: A non-transitory computer-readable medium storing code for wireless communication, the code comprising instructions executable by a processor to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
transmit communications on a primary component carrier (PCC) and a secondary component carrier (SCC); and
refrain from transmission on the SCC based at least in part on the UE determining to drop the SCC, wherein the UE determines to drop the SCC using:
a determination by the UE that an error rate of the transmitted communications on the SCC satisfies an error threshold, and
a determination by the UE that an amount of transmission power headroom available to the UE for transmitting on the SCC does not satisfy a power threshold.

2. The UE of claim 1, wherein the error rate is a block error rate (BLER), and wherein the one or more processors, to refrain from transmission on the SCC, are configured to refrain from transmission on the SCC based at least in part on a determination that the BLER satisfies a BLER threshold.

3. The UE of claim 1, wherein the one or more processors, to refrain from transmission on the SCC, are configured to refrain from transmission on the SCC based at least in part on a determination that the error rate has not improved after transmitting hybrid automatic repeat request feedback.

4. The UE of claim 1, wherein the one or more processors, to refrain from transmission on the SCC, are configured to refrain from transmission on the SCC based at least in part on a determination that an amount of pathloss satisfies a pathloss threshold.

5. The UE of claim 1, wherein the one or more processors, to refrain from transmission on the SCC, are configured to ignore one or more grants for transmission on the SCC.

6. The UE of claim 1, wherein the one or more processors, to refrain from transmission on the SCC, are configured to apply discontinuous transmission on a physical uplink shared channel.

7. The UE of claim 1, wherein the one or more processors, to refrain from transmission on the SCC, are configured to transmit an acknowledgement on the PCC for data received on the SCC.

8. The UE of claim 1, wherein the one or more processors are configured to restart transmission on the SCC after a configured time duration.

9. The UE of claim 1, wherein the one or more processors are configured to restart transmission on the SCC based at least in part on a determination that the amount of transmission power headroom for the UE has increased by a threshold amount.

10. The UE of claim 1, wherein the one or more processors are configured to restart transmission on the SCC based at least in part on a determination that a modulation and coding scheme decreased by a threshold amount.

11. The UE of claim 1, wherein the one or more processors are configured to restart transmission on the SCC based at least in part on a determination that a resource block allocation decreased by a threshold amount.

12. The UE of claim 1, wherein the PCC and the SCC are associated with carrier aggregation.

13. The UE of claim 1, wherein the PCC and the SCC are associated with dual connectivity.

14. A base station for wireless communication, comprising:
one or more memories; and
one or more processors, coupled to the one or more memories, configured to:
schedule uplink communications for a user equipment (UE) on a primary component carrier (PCC) and a secondary component carrier (SCC); and
adjust scheduling of uplink communications for the UE on the SCC based at least in part on the UE dropping the SCC, wherein the UE drops the SCC using:
a determination that an error rate of the uplink communications on the SCC satisfies an error threshold, and
a determination that an amount of transmission power headroom available to the UE for transmitting on the SCC does not satisfy a power threshold.

15. The base station of claim 14, wherein the error rate is a block error rate (BLER), and wherein the one or more processors, to adjust scheduling of uplink communications on the SCC, are configured to adjust scheduling of uplink communications on the SCC based at least in part on a determination that the BLER satisfies a BLER threshold.

16. The base station of claim 14, wherein the one or more processors, to adjust scheduling of uplink communications on the SCC, are configured to adjust scheduling of uplink communications on the SCC based at least in part on a determination that the error rate has not improved after receiving hybrid automatic repeat request feedback.

17. The base station of claim 14, wherein the one or more processors, to adjust scheduling of uplink communications on the SCC, are configured to adjust scheduling of uplink communications on the SCC based at least in part on a determination that an amount of pathloss satisfies a pathloss threshold.

18. The base station of claim 14, wherein the one or more processors, to adjust scheduling of uplink communications on the SCC, are configured to reduce the scheduling of uplink communications on the SCC.

19. The base station of claim 14, wherein the one or more processors, to adjust scheduling of uplink communications on the SCC, are configured to refrain from scheduling uplink communications on the SCC.

20. The base station of claim 14, wherein, to adjust scheduling of uplink communications for the UE on the SCC, the one or more processors are configured to schedule the UE to apply discontinuous transmission on a physical uplink shared channel.

21. The base station of claim 14, wherein, to adjust scheduling of uplink communications for the UE on the SCC, the one or more processors are configured to receive an acknowledgement on the PCC for data transmitted on the SCC.

22. The base station of claim 14, wherein the one or more processors are configured to restart or increase scheduling of uplink communications for the UE on the SCC after a configured time duration.

23. The base station of claim 14, wherein the one or more processors are configured to restart or increase scheduling of uplink communications for the UE on the SCC based at least in part on a determination that the amount of transmission power headroom for the UE has increased by a threshold amount.

24. The base station of claim 14, wherein the one or more processors are configured to restart or increase scheduling of uplink communications for the UE on the SCC based at least in part on a determination that a modulation and coding scheme decreased by a threshold amount.

25. The base station of claim 14, wherein the one or more processors are configured to restart or increase scheduling of uplink communications for the UE on the SCC based at least in part on a determination that a resource block allocation decreased by a threshold amount.

26. The base station of claim 14, wherein the PCC and the SCC are associated with carrier aggregation or dual connectivity.

27. A method of wireless communication performed by a user equipment (UE), comprising:
    transmitting communications on a primary component carrier (PCC) and a secondary component carrier (SCC); and
    refraining from transmission on the SCC based at least in part on the UE determining to drop the SCC, wherein the UE determines to drop the SCC using:
        a determination by the UE that an error rate of the transmitted communications on the SCC satisfies an error threshold, and
        a determination by the UE that an amount of transmission power headroom available to the UE for transmitting on the SCC does not satisfy a power threshold.

28. The method of claim 27, wherein refraining from transmission on the SCC comprises:
    refraining from transmission on the SCC based at least in part on a determination that the error rate has not improved after transmitting hybrid automatic repeat request feedback.

29. A method of wireless communication performed by a base station, comprising:
    scheduling uplink communications for a user equipment (UE) on a primary component carrier (PCC) and a secondary component carrier (SCC); and
    adjusting scheduling of uplink communications for the UE on the SCC based at least in part on the UE dropping the SCC, wherein the UE drops the SCC using:
        a determination that an error rate of the uplink communications on the SCC satisfies an error threshold, and
        a determination that an amount of transmission power headroom available to the UE for transmitting on the SCC does not satisfy a power threshold.

30. The method of claim 27, wherein refraining from transmission on the SCC comprises:
    ignoring one or more grants for transmission on the SCC.

* * * * *